United States Patent
Winnestaffer et al.

(10) Patent No.: US 6,913,026 B2
(45) Date of Patent: Jul. 5, 2005

(54) METHODS FOR CLEANING CATALYTIC CONVERTERS

(75) Inventors: David L. Winnestaffer, Cincinnati, OH (US); Victor L. Bonin, Port St. Lucie, FL (US)

(73) Assignee: Enerfab, Inc., Cincinnati, OH (US)

( * ) Notice: Subject to any disclaimer, the term of this patent is extended or adjusted under 35 U.S.C. 154(b) by 0 days.

(21) Appl. No.: 10/437,471

(22) Filed: May 14, 2003

(65) Prior Publication Data

US 2004/0163676 A1 Aug. 26, 2004

Related U.S. Application Data

(60) Provisional application No. 60/450,080, filed on Feb. 25, 2003.

(51) Int. Cl.[7] .................................................. B08B 5/02
(52) U.S. Cl. ..................... 134/22.18; 134/22.1; 134/34; 134/37
(58) Field of Search .............................. 134/22.1, 22.12, 134/22.18, 34, 37, 32, 17, 36

(56) References Cited

U.S. PATENT DOCUMENTS

| | | | |
|---|---|---|---|
| 5,522,941 A | * 6/1996 | Uchinami et al. | ............ 134/37 |
| 5,820,693 A | * 10/1998 | Patchett et al. | .......... 134/22.12 |
| 5,882,422 A | 3/1999 | Obayashi et al. | |
| 6,232,254 B1 | 5/2001 | Schneider et al. | |
| 6,241,826 B1 | 6/2001 | Dittmar et al. | |
| 6,454,871 B1 | * 9/2002 | Labib et al. | ................... 134/8 |
| 6,484,733 B2 | 11/2002 | Budin et al. | |

FOREIGN PATENT DOCUMENTS

| | | |
|---|---|---|
| DE | 3816600 A1 | 11/1989 |
| EP | 0677320 B1 | 2/1995 |
| EP | 0834349 A1 | 4/1998 |
| EP | 0972560 A2 | 4/1999 |
| EP | 1107824 B1 | 7/1999 |
| EP | 0974397 A3 | 1/2000 |
| EP | 0974397 A2 | 1/2000 |

* cited by examiner

*Primary Examiner*—Michael Barr
*Assistant Examiner*—Saeed Chaudhry
(74) *Attorney, Agent, or Firm*—Dinsmore & Shohl LLP

(57) ABSTRACT

The present invention is directed toward methods for cleaning catalytic converters, particularly it pertains to methods of submerging a catalytic converter into an aqueous bath and applying a pressurized fluid through the catalytic converter forcing ash from the channels within the catalytic converter.

24 Claims, 2 Drawing Sheets

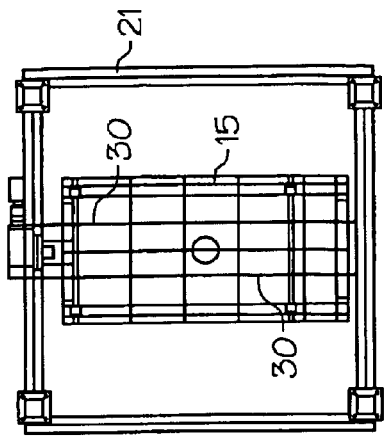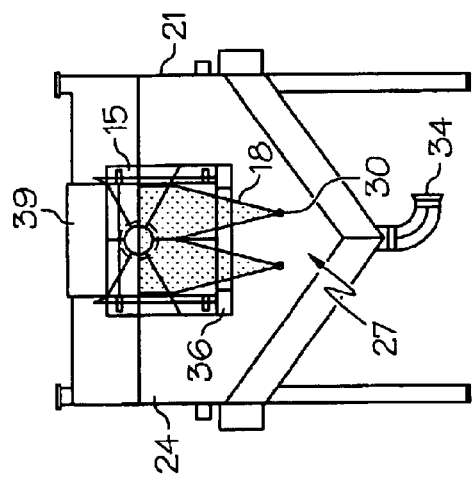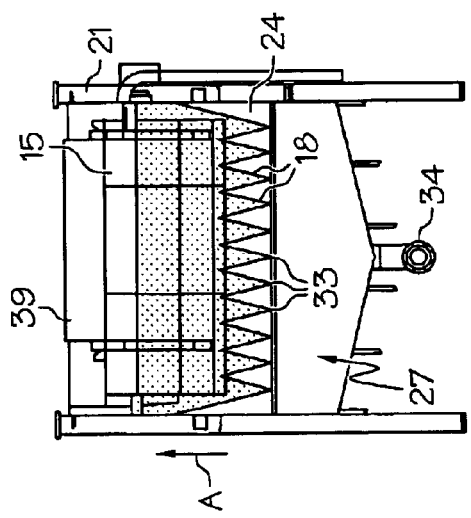

METHODS FOR CLEANING CATALYTIC CONVERTERS

This application claims the benefit of Provisional Application No. 60/450,080, filed Feb. 25, 2003.

TECHNICAL FIELD

The present invention relates to methods for cleaning used deNOx or dedioxin catalytic converters. More particularly, it relates to methods for removing particulate ash, such as popcorn ash, using a pressurized fluid which is forced through the channels of the catalytic converter.

BACKGROUND

Industries have struggled to provide systems that allow their plants and processes to meet federal and state regulations regarding clean air emissions. One of the successful techniques which has allowed industries to become compliant has been the use of catalytic converters to process gaseous streams prior to release to the environment. One such process is known as selective catalytic reduction, or SCR, which serves as one possible option for lowering or even substantially lowering the levels of nitrogen oxides formed during the combustion of fossil fuels in combustion plants. Particularly, catalysts that are used in so-called deNOx or dedioxin installations are used for reducing and breaking down nitrogen oxides.

In the SCR process, the nitrogen oxides are converted into nitrogen and water using ammonia or substances which form ammonia under the system conditions as a reducing agent and catalysts in the catalytic converter. Typical catalysts for use in these processes comprise a base material, for example titanium dioxide, $TiO_2$, in which active metal compounds, for example, $V_2O_3$ and/or $WO_3$, are homogeneously distributed. Because the catalytic reactions proceed on the surface of the catalyst, a large specific surface area is typically provided through the use of correspondingly porous materials for the reaction, for example, in a honeycomb structure.

However, due to the accumulation of alkali metals, alkaline earth metals, or other particulates, which are contained in fly ash, the reaction at active centers on the catalyst becomes partially, and in some cases substantially, impeded. Therefore, the nature of the composition of the compounds which may be deposited on the catalyst is dependent on the composition of the fly ash. Generally, the removal of fly ash from catalytic converters is well known in the art.

In addition to typical fly ash, harder, larger ash particulate, referred to in the industry as popcorn ash, has become a problem in catalytic converters as a combustion by-product of certain fuels used in North American fossil fuel power plants. The lifespan of new catalysts becomes significantly reduced because of the build up of popcorn ash inside the channels of catalytic converters. Popcorn ash consists of large particles of fused ash that can become very hard, and have irregular shapes. Some popcorn ash can have orientations which are narrow enough to fit into the channels of the catalytic converter, while others are too large to fit. When popcorn ash enters the catalytic converter along certain orientations, it becomes lodged in the catalytic converter. The lodging of the popcorn ash can cause normal fly ash to fill the rest of the channel of the catalytic converter, thereby essentially blocking the catalyst channel, such that few or no reactive catalyst sites are available to perform the intended reduction reactions on the nitrogen oxides.

Conventional processes for fly ash removal are typically not effective for substantially complete removal of popcorn ash. It has also been determined that forcing the popcorn ash through the catalytic converter will only further lodge the popcorn ash, and therefore, further impede the catalytic converter. Moreover, attempts to remove popcorn ash using wet/dry vacuums results in collapse of channel structure in the catalytic converter. Accordingly, a need exists for techniques to effectively remove popcorn ash from catalytic converters.

SUMMARY OF THE INVENTION

It is therefore an object of the present invention to provide methods for cleaning catalytic converters. It is an additional object to provide methods which may be used to remove both popcorn ash and fly ash from a catalytic converter.

In accordance with one embodiment of the present invention, a method for cleaning a catalytic converter comprises submerging the catalytic converter into an aqueous bath and applying a pressurized fluid through the catalytic converter to force the ash from channels within the catalytic converter.

In accordance with another embodiment, the present invention is directed to a method for cleaning a catalytic converter, which method comprises vacuuming outer surfaces of the catalytic converter, submerging the catalytic converter into a wash solution, moving the catalytic converter in the wash solution, and removing the catalytic converter from the wash solution. The method further comprises rinsing the catalytic converter, submerging the catalytic converter into an aqueous bath, and applying a pressurized fluid through the catalytic converter to force ash from channels within the catalytic converter.

The methods of the invention are advantageous for removing ash, particularly fly ash and popcorn ash, from catalytic converters, for example, those used in deNOx processes. Still other advantages, applications and embodiments of the present invention will become apparent to those skilled in this art from the following description wherein there are shown and/or described several exemplary embodiments of this invention, by way of illustration, for carrying out the invention. As will be realized, the invention is capable of other different aspects, all without departing from the invention. Accordingly, the descriptions and drawings should be regarded as illustrative in nature and not restrictive.

BRIEF DESCRIPTION OF THE DRAWINGS

While the specification concludes with claims which particularly point out and distinctly claim the present invention, it is believed that the present invention will be better understood from the following description of exemplary embodiments, taken in conjunction with the accompanying drawings, in which like reference numerals identify like elements throughout the views and wherein:

FIG. 1 is a side view illustrating an exemplary embodiment of a tank in which a pressurized fluid is being applied to a catalytic converter in accordance with a method of the invention.

FIG. 2 is a front view which further illustrates the exemplary embodiment of FIG. 1, depicting a piping system that applies the pressurized fluid to the flue gas outlet surface of the catalytic converter.

FIG. 3 illustrates a top plan view further depicting the exemplary embodiment of FIG. 2, wherein the piping system includes two pipes having numerous orifices along their axes in order to apply a pressurized fluid to the flue gas outlet surface of the catalytic converter which it is partially submerged in the aqueous bath.

DETAILED DESCRIPTION OF THE EXEMPLARY EMBODIMENTS OF THE INVENTION

Figure 5:
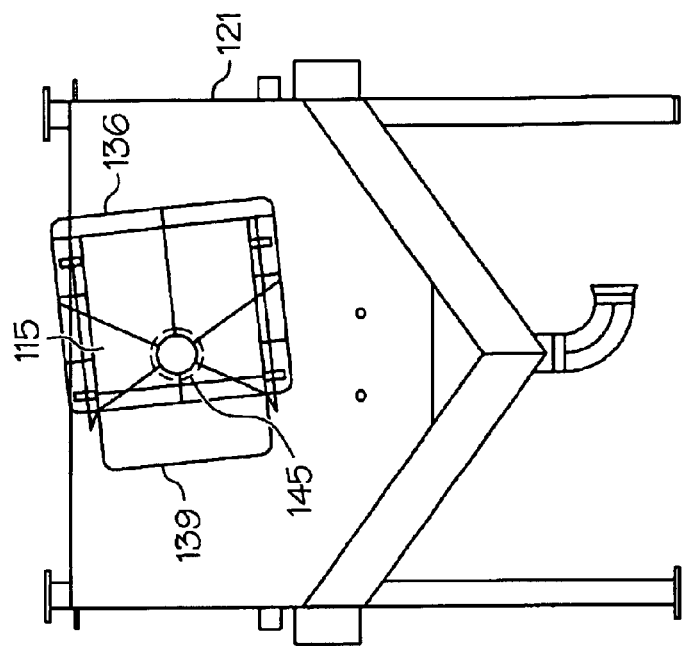
FIG. 5 is a side view illustrating an exemplary embodiment in which the catalytic converter is tilted to its full horizontal position such that a rinse can be applied to the bottom portion of the catalytic converter, thereby passing water through the channels in the catalytic converter to remove additional popcorn ash and fly ash.

The methods of the present invention are herein described in detail in connection with the views of FIGS. 1–5 illustrating various aspects of exemplary embodiments thereof. Like numbers indicate like elements among the corresponding views. In FIGS. 1–5, methods for cleaning catalytic converters 15 are illustrated such that ash, which lodges within the channels of the catalytic converter 15 while flue gas passes through the system, is removed.

As will be described in further detail, the present methods are successful in removing popcorn ash by forcing the ash out of the catalytic converter 15 in a direction opposite of that in which the flue gas enters the catalytic converter 15. In achieving these goals, it is important that no excessive force be applied to the catalytic converters 15 because such force could cause the channels in the catalytic converter 15 to collapse, thereby effectively destroying the value of the catalytic converter 15. In addition, because of the overall size of these catalytic converters 15, typical cleaning techniques will be extremely cumbersome and often are not successful, and therefore, the methods as described below must be employed to effectively clean the catalytic converters 15.

FIGS. 1–3 illustrate exemplary embodiments of the present invention. As shown in FIG. 1, the catalytic converter 15 is submerged into an aqueous bath 24 and a pressurized fluid 18 is applied through the catalytic converter 15 to dislodge ash from channels within the catalytic converter 15. As illustrated in FIG. 1, the tank 21 contains an aqueous bath 24 wherein the catalytic converter 15 is submerged in the aqueous bath 24. The catalytic converter 15 is considered to be submerged when any part of the catalytic converter 15 is below the surface of the aqueous bath 24 or any other solution the catalytic converter 15 may be placed in. The aqueous bath 24 can comprise tap water, river water, filtered water, or any type of water which would effectively help to provide for the removal of the ash from the catalytic converter 15, when used in combination with the pressurized fluid 18.

The pressurized fluid 18, as shown in this exemplary embodiment, is passed through a piping system 27. As is illustrated in the exemplary embodiment depicted by FIGS. 1–3, there are two sparger pipes 30 that run the length of the tank 21 containing the aqueous bath 24. The sparger pipes 30 contain orifices 33 along the upper surface of the sparger pipes 30 such that the pressurized fluid 18 supplied at inlet 34 can pass through the orifices 33 and travel upward in the tank towards the flue gas outlet surface 36 (bottom portion) of the catalytic converter 15 in order to remove both popcorn ash and fly ash from the channels within the catalytic converter 15. In a specific embodiment, the pressurized fluid 18 is applied to the catalytic converter 15 in a direction shown by arrow "A" substantially opposite to a direction in which flue gas operably passes through the catalytic converter 15 during use of the catalytic converter 15, for example, in a fossil fuel combustion plant. As illustrated, the sparger pipes 30 are positioned a distance from the catalytic converter 15 such that the pressurized fluid 18 effectively interacts with the flue gas outlet surface 36 of the catalytic converter 15 to remove substantial amounts of popcorn fly ash. One skilled in the art will appreciate that alternative techniques for applying a pressurized fluid through the catalytic converter may be employed within the scope of the inventive methods. During operation of the catalytic converter 15, the flue gas passes through the outer flue gas intake surface 39 (top portion) of the catalytic converter 15, such that organic particulates, particularly fly ash and popcorn ash, gather within the catalytic converter 15, thereby lodging the catalyst in the channels of the catalytic converter 15 and blocking active sites available to facilitate the reduction of nitrogen oxides. Application of the pressurized fluid forces ash, even hard, aggregated popcorn ash from the channels to expose the active sites. The pressurized fluid 18 can comprise a liquid or a gas. The gas can comprise, for example, air, nitrogen or mixtures thereof, while the liquid can comprise, for example, water. One skilled in the art will recognize other pressurized fluids which may be employed within the scope of the inventive methods.

In one exemplary embodiment, the pressurized fluid 18 has a pressure of at least about 25 psig. In another exemplary embodiment, the pressurized fluid 18 has a pressure of at least about 40 psig. In yet another exemplary embodiment, the pressurized fluid 18 has a pressure of at least about 50 psig. In still another exemplary embodiment, the pressurized fluid 18 has a pressure of at least about 70 psig. In yet another exemplary embodiment, the pressurized fluid 18 has a pressure of at least about 100 psig. In another exemplary embodiment, the pressurized fluid 18 has a pressure sufficiently high enough to remove the popcorn ash without causing harm to the catalytic converter 15.

In one exemplary embodiment, the pressurized fluid 18 is applied to the catalytic converter 15 at a rate of at least about 10 ft$^3$/min. In another exemplary embodiment, the pressurized fluid 18 is applied to the catalytic converter 15 at a rate of at least about 15 ft$^3$/min. In another exemplary embodiment the pressurized fluid 18 is applied to the catalytic converter 15 at a rate of at least about 25 ft$^3$/min. In still another exemplary embodiment, the pressurized fluid 18 is applied to the catalytic converter 15 at a rate at least about 35 ft$^3$/min. In yet another exemplary embodiment the pressurized fluid 18 is applied to the catalytic converter 15 at a rate of at least about 50 ft$^3$/min. In another exemplary embodiment, the pressurized fluid 18 is applied to the catalytic converter 15 at a rate sufficiently high enough to remove popcorn ash without causing harm to the catalytic converter 15.

In one exemplary embodiment of the present invention, the pressurized fluid 18 is applied to the flue gas outlet surface 36 of the catalytic converter 15 for at least 5 minutes, more specifically, at least 10 minutes and, in another embodiment, for about 20 minutes.

In one exemplary embodiment, it is important that the aqueous bath 24 be substantially free of surface-active agents which are conventionally employed in wash baths because the agitation applied by the pressurized fluid 18 to the catalytic converter 15 to remove popcorn fly ash from the channels of the catalytic converter 15 could cause substantial foaming or suds which may hinder the process. In another exemplary embodiment, the aqueous bath 24 may contain one or more surface-active agents, although in this embodiment, it may be advantageous to add an anti-foaming agent to prevent suds from hindering the process of removing ash.

Upon having the catalytic converter 15 undergo effective treatment by the pressurized fluid 18, another option to achieve an effective removal of popcorn ash and fly ash in this system is to drain the aqueous bath 24 from the tank 21 and tilt the catalytic converter 15 to a substantially horizontal position such that the flue gas outlet surface 36 of the catalytic converter 15 can be rinsed with a stream of water. This stream of water can be generated by a hose or header pipe having adjustable spray nozzles. In one embodiment, the rinsing or spraying is methodical so that the channels of the catalytic converter 15 receive a blast from the stream of water helping to remove popcorn ash and fly ash. The loosened ash particles may appear on the flue gas intake surface 39, and therefore, an additional rinse can be performed in order to remove these ash particles.

In one exemplary embodiment, the catalytic converter 15 is hoisted to another open tank 21 which is filled with another aqueous bath 24, wherein it is rinsed in this bath and then removed and allowed to drain. In one particular exemplary embodiment, the catalytic converter 15 is allowed to drain for approximately one minute. In another exemplary embodiment of the present invention, this sequence where the catalytic converter 15 is hoisted into this aqueous bath 24 and then removed and allowed to drain can be repeated numerous times in order to effectively flush out the channels and wash the outer surfaces of the catalytic converter 15 that still may have some loosened popcorn ash or fly ash remaining on them.

In another exemplary embodiment, the catalytic converter 15 is then dried. One skilled in the art will appreciate that various techniques may be employed for drying the catalytic converter. For example, the catalytic converter may be air or drip dried and/or dried using a dryer. In one exemplary embodiment, the catalytic converter 15 is drip dried for about 24 hours and then placed on a drier for about 90 minutes in order to effectively remove any aqueous material that may remain within the catalytic converter 15. Once a substantial amount of the aqueous material is removed, the flue gas intake surface 39 of the catalytic converter 15 is vacuumed in order to remove any remaining loosened ash on the catalytic converter 15. In a particular exemplary embodiment, this vacuuming can be achieved with an industrial vacuum. It is important to note that vacuuming can be used at the beginning of the process to remove fly ash and loose popcorn ash from the top surface of the catalytic converter 15, but is not effective to remove ash or popcorn ash located within the depths of the catalytic converter 15 channels. Furthermore, although a vacuuming system is effectively used in one embodiment during the last part of the method in order to remove additional popcorn ash and fly ash, particularly from surfaces, a vacuuming system is not applied in place of the pressurized fluid 18 at an initial stage of this process, because any harsh agitation or vacuum applied to the catalytic converter 15 sufficient to remove popcorn ash often causes a crippling or caving of the channels within the catalytic converter 15, thereby destroying any and all effectiveness that the catalytic converter 15 would have in reducing the amount of nitrogen oxides released from the system during use.

In one exemplary embodiment of the present invention, the method for cleaning the catalytic converter 15 provides that at least 70% of the channels in the catalytic converter 15 are open, such that the channels are substantially free of ash pluggage. In another exemplary embodiment, the method provides that at least 80% of the channels in the catalytic converter 15 are open. In yet another exemplary embodiment, the method provides that at least 90% of the channels in the catalytic converter 15 are open.

In one exemplary embodiment, prior to application of the pressurized fluid 18 as described above, the fly ash filling in the channels and around the popcorn ash is removed first. The fly ash may be removed by vacuuming and/or by use of a wash solution, for example, by immersing the catalytic converter 15 in a wash solution and optionally agitating or moving the catalytic converter in the wash solution. The wash solution may comprise one or more surface-active agents to assist in removal of fly ash from the catalytic converter 15. Suitable surface-active agents will be apparent to one skilled in the art, examples of which include, but are not limited to, anionic surface-active agents, nonionic surface-active agents and the like. Low foaming surface-active agents are preferred in one embodiment.

Figure 4:
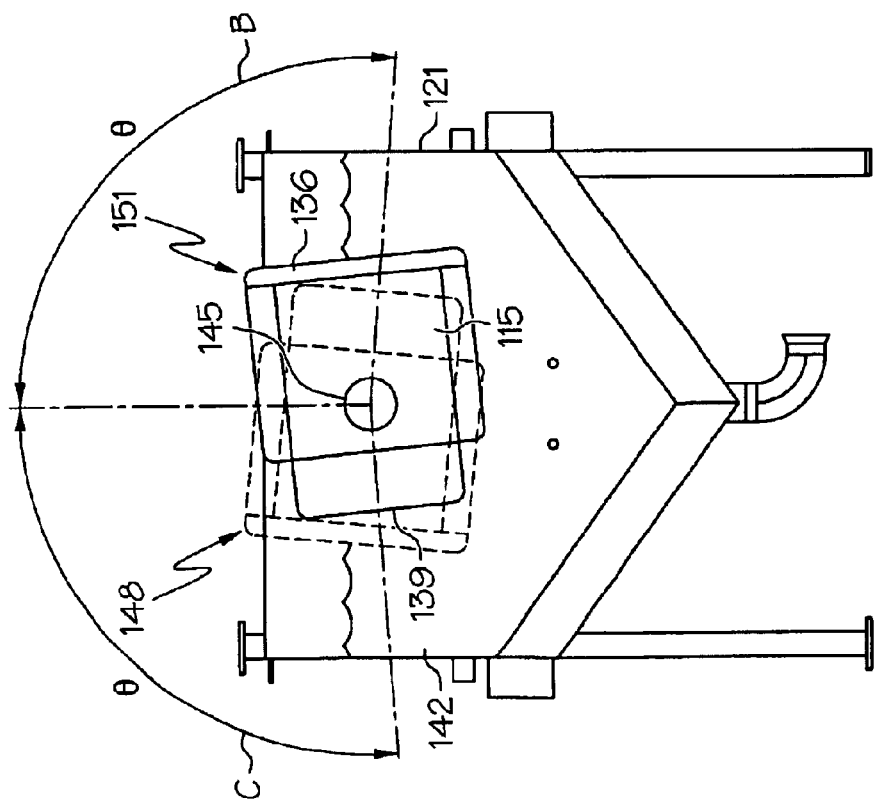
FIG. 4 is a side view depicting an exemplary embodiment illustrating movement of a catalytic converter in a wash solution.

FIG. 4 depicts a side view illustrating an exemplary embodiment of agitation or movement of a catalytic converter 115 as it undergoes rotation in a wash solution 142. The catalytic converter 115 comprises a first pivoting 148 of the catalytic converter 115 in a first direction to a first substantially horizontal position, and a second pivoting 151 of the catalytic converter 115 in a second direction opposite the first direction to a second substantially horizontal position, wherein the first and second pivotings 148,151 are effective to move a flue gas intake surface 139 of the catalytic converter 115 in and out of a wash solution 142. As further illustrated in this exemplary embodiment, the catalytic converter 115 rotates along a rotational axis 145 having a range of about θ degrees. In one exemplary embodiment, starting from an orientation as shown in FIGS. 1–3, wherein the flue gas outlet surface 136 is positioned within the aqueous bath, the rotational range is sufficient for a portion of the flue gas outlet surface 136 to be brought out of the aqueous bath, and/or a portion of the flue gas intake surface 139 to be submerged in the aqueous bath. In one embodiment, some portion of the flue gas outlet surface 136 is brought out of the aqueous bath at some point during the rotational movement, and/or, each portion of the flue gas intake surface 139 is submerged in the aqueous bath during the rotational movement. In a more specific embodiment, the rotation of θ degrees can comprise from about 60 to about 150 degrees, more specifically, about 95 degrees on each side of the vertical axis of the catalytic converter 115. As illustrated in the embodiment of FIG. 4, the catalytic converter 115 is not fully submerged within the wash solution 142; however, the catalytic converter 115 is at all times partially submerged such that some amount of the flue gas outlet surface 136 of the catalytic converter 115 is in contact with the wash solution 142. For example, the movement of the catalytic converter 115 comprises a first pivoting 148 of the catalytic converter 115 in a first direction shown by arrow "B" to a first substantially horizontal position, shown in phantom in FIG. 4, and a second pivoting 151 of the catalytic converter 115 in a second direction shown by arrow "C" opposite the first direction to a second substantially horizontal position, shown in solid lines. This allows for the catalytic converter 115 to contact the wash solution 142 at some point along its entire outer surface. The first pivoting 148 and second pivoting 151 are effective to move the flue gas intake surface 139 of the catalytic converter 115 in and out of the wash solution 142. As illustrated by FIG. 4, some portion of the flue gas intake surface 139 is submerged within the wash solution 142 during the rotation.

This rotation movement of the catalytic converter 115 is advantageous to methods of removing ash from the catalytic converter 115. As the fly ash is contacted by the wash solution 142, the catalytic converter 115 has an opportunity to have the fly ash drained or removed from the catalytic converter 115 by having the wash solution 142 drain out of the channels as the catalytic converter 115 undergoes the rotation. This rotation traps air in the channels within the catalytic converter 115, thereby compressing the catalyst as it is submerged. Once the ash is sufficiently wet, this compressed air causes individual channels of wet ash to exit the channels and lay on the flue gas intake surface 139 of the catalytic converter 115. Once the flue gas intake surface 139 of the catalytic converter 115 is submerged, these individual channels of wet ash are washed away due to the rotational movement of the catalytic converter 115, such that the solution and loosened ash flow over the sides of the catalytic converter 115. The catalytic converter 115 can undergo this washing stage prior to being engaged by a pressurized fluid 18 in one exemplary embodiment.

In one embodiment, the catalytic converter 115 undergoes the rotation in the wash solution 142 for an amount of time sufficient to prepare the catalytic converter 115 for application of the pressurized fluid 18 such that a substantial amount of popcorn ash may be removed. In one exemplary embodiment, this washing step can be carried out wherein the temperature of the wash solution 142 is at least 30° C.

As noted, the wash solution may comprise a surface-active agent. Additionally, or alternatively, the wash solution may comprise at least one compound creating active centers within the channels of the catalytic converter 115, or mixtures thereof. The surface-active agents may comprise anionic surfactant, nonionic surfactant, or mixtures thereof. The metal compounds may comprise vanadium compounds, tungsten compounds, molybdenum compounds, and mixtures thereof. The surfactants used as the surface-active agents can comprise low-foaming surfactants. The metal compounds can be essentially free of alkali metals, alkaline earth metals, halogens, and sulfur. In another exemplary embodiment, the wash solution can further comprise acids and lyes. In another exemplary embodiment, the wash solution may further comprise complex-forming substances and ion exchangers. In yet another exemplary embodiment, the wash solution can further comprise oxidizing or reducing additives. Moreover, in another exemplary embodiment, the wash solution may further comprise organic solvents.

As illustrated in FIG. 5, the catalytic converter 115 is substantially rotated about its horizontal axis while the tank 121, which contains the wash solution 142, is drained. A rinse is applied to the flue gas outlet surface 136 of the catalytic converter 115 such that ash is removed from the channels of the catalytic converter 115 and can be seen to leave the flue gas intake surface 139 of the catalytic converter 115. During this step, popcorn ash and some fly ash particles are discharged from the flue gas intake surface 139 of the catalytic converter 115. In one embodiment, this rinsing or spraying is very methodical so that every channel within the catalytic converter 115 receives a rinse from a stream of water, and is done in a way to minimize structural damage to the catalyst and packing and/or gasketing components within the catalytic converter 115. This is achieved by minimizing the amount and pressure of water that is applied. In an exemplary embodiment, this stream of water can be achieved through the use of a hose or header pipe having adjustable spray nozzles. Once the popcorn ash and fly ash exit from the flue gas intake surface 139 of the catalytic converter 115, an additional rinse can be made to the flue gas intake surface 139 to help remove the popcorn ash and fly ash which were removed from the channels of the catalytic converter 115.

The foregoing description of various embodiments of the present invention has been presented for purposes of illustration and description. It is not intended to be exhaustive or to limit the invention to the forms described. Further modifications are possible in light of the above teachings and would be understood by those of ordinary skill. The exemplary embodiments were chosen and described in order to provide examples for illustrating the various principles and adaptability of the invention in various embodiments as are suited to exemplary uses contemplated. Consequently, it is hereby intended that the scope of the present invention is not to be limited to or by the exemplary embodiments shown and/or described herein, but are to be defined by the claims appended hereto.

We claim:

1. A method for cleaning a catalytic converter to regenerate catalytic active sites on the catalytic converter, comprising:

submerging the catalytic converter into an aqueous bath substantially free of a surface-active substance; and applying a pressurized fluid through the catalytic converter to force ash from channels within the catalytic converter, the method exposing the catalytic active sites.

2. The method according to claim 1, wherein the pressurized fluid is applied in a direction substantially opposite to a direction in which flue gas operably passes through the catalytic converter.

3. The method according to claim 2, wherein the pressurized fluid is applied by a piping system extending through the aqueous bath.

4. The method according to claim 3, wherein the piping system comprises at least one sparger pipe.

5. The method according to claim 1, wherein the pressurized fluid comprises a gas.

6. The method according to claim 5, wherein the gas comprises air, nitrogen or mixtures thereof.

7. The method according to claim 1, wherein the pressurized fluid comprises a liquid.

8. The method according to claim 7, wherein the liquid comprises water.

9. The method according to claim 1, wherein the pressurized fluid has a pressure of at least about 25 psig.

10. The method according to claim 1, wherein the pressurized fluid is applied to the catalytic converter at a rate of at least about 10 ft$^3$/min.

11. The method according to claim 1, wherein the catalytic converter comprises a deNOx or dedioxin converter.

12. The method according to claim 1, wherein the ash comprises popcorn ash.

13. The method according to claim 1, wherein at least 90% of the channels in the catalytic converter are open subsequent to cleaning.

14. The method according to claim 1, further comprising, subsequent to application of the pressurized fluid:

rinsing the catalytic converter;

drying the catalytic converter; and vacuuming the catalytic converter to remove remaining ash.

15. A method according to claim 1, further comprising, prior to submerging the catalytic converter into an aqueous bath:

vacuuming outer surfaces of the catalytic converter;

submerging the catalytic converter into a wash solution;

moving the catalytic converter in the wash solution;

removing the catalytic converter from contact with the wash solution; and rinsing the catalytic converter.

16. The method of claim 15, further comprising, subsequent to application of the pressurized fluid:

rinsing the channels of the catalytic converter;

rinsing outer surfaces of the catalytic converter;

drying the catalytic converter; and vacuuming the catalytic converter to remove remaining ash.

17. The method of claim 16, wherein the rinsing of the outer surfaces of the catalytic converter and the drying of the catalytic converter are repeated at least once prior to vacuuming the catalytic converter.

18. The method of claim 16, wherein the rinsing of the outer surfaces of the catalytic converter is conducted in a rinse tank.

19. The method according to claim 15, wherein the wash solution comprises a surface-active agent, at least one metal compound creating active centers, or mixtures thereof.

20. The method according to claim 19, wherein the surface-active agent comprises anionic surfactants, nonionic surfactants or mixtures thereof.

21. The method according to claim 19, wherein the at least one metal compound comprises vanadium compounds, tungsten compounds, molybdenum compounds or mixtures thereof.

22. The method according to claim 15, wherein moving the catalytic converter comprises a first pivoting of the catalytic converter in a first direction to a first substantially horizontal position, and a second pivoting of the catalytic converter in a second direction opposite the first direction to a second substantially horizontal position, wherein the first and second pivotings are effective to move a flue gas intake surface of the catalytic converter in and out of the wash solution.

23. The method according to claim 1, wherein the pressurized fluid is applied by passing the pressurized fluid through at least one sparger pipe at a pressure of at least about 25 psig.

24. The method according to claim 23, wherein the pressurized fluid passes through the at least one sparger pipe at a rate of at least about 10 ft$^3$/min.

* * * * *

UNITED STATES PATENT AND TRADEMARK OFFICE
CERTIFICATE OF CORRECTION

PATENT NO. : 6,913,026 B2
DATED : July 5, 2005
INVENTOR(S) : Winnestaffer, David L. et al.

It is certified that error appears in the above-identified patent and that said Letters Patent is hereby corrected as shown below:

Column 8,
Line 25, change "applying a pressurized fluid through the catalytic converter" to
-- applying a pressurized fluid through the submerged catalytic converter --.
Line 65, change "A method according to claim 1," to -- The method according to claim 1, --.

Signed and Sealed this

Thirteenth Day of September, 2005

JON W. DUDAS
*Director of the United States Patent and Trademark Office*